March 27, 1934.　　　A. M. VEDOE　　　1,952,342
REAMING TOOL
Filed Nov. 26, 1930
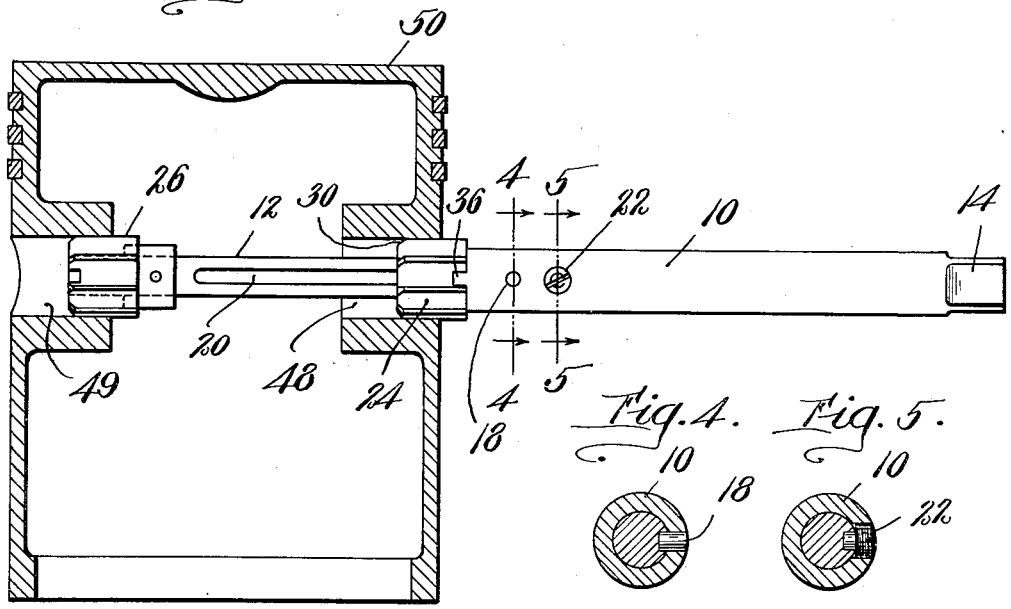
Fig. 1.
Fig. 4.　Fig. 5.
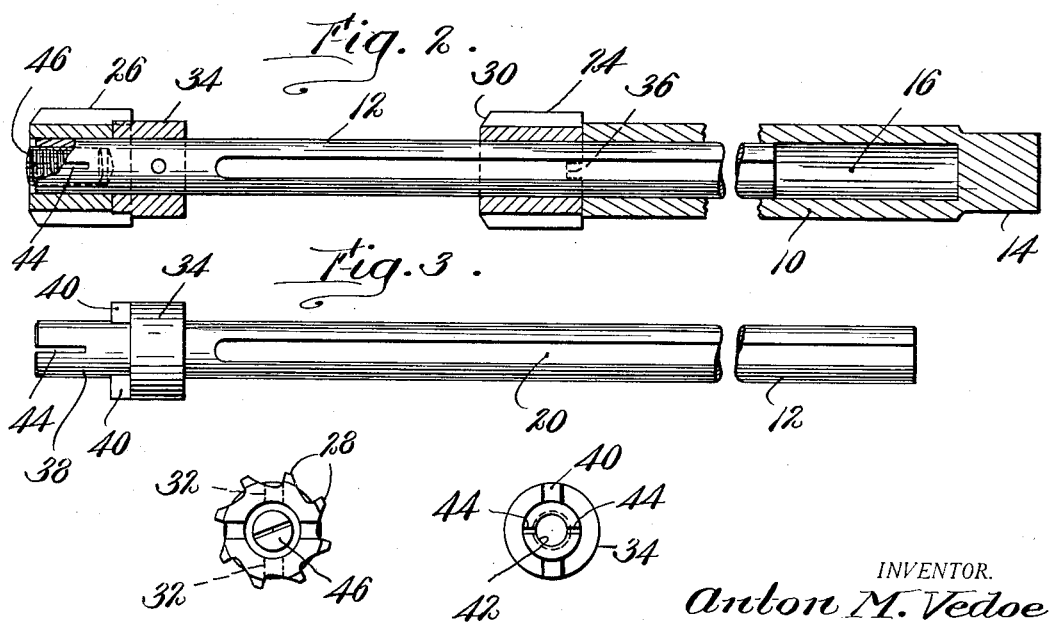
Fig. 2.
Fig. 3.
Fig. 6.　Fig. 7.
INVENTOR.
Anton M. Vedoe
BY
ATTORNEY.

Patented Mar. 27, 1934

1,952,342

UNITED STATES PATENT OFFICE 1,952,342

REAMING TOOL

Anton M. Vedoe, Quincy, Mass., assignor to Vedoe-Peterson Co., Norfolk Downs, Mass., a copartnership consisting of Anton M. Vedoe and Erick J. Peterson Application November 26, 1930, Serial No. 498,375

2 Claims. (Cl. 77—72)

This invention relates to tools, and more especially to a reaming tool particularly adapted to simultaneously operate on two aligned and relatively spaced holes. Heretofore, such aligned holes have commonly been independently reamed in separate operations. In accordance with my invention, I mount a pair of reaming cutters in axial alignment and relatively spaced relation on a supporting shank or shanks, the arrangement being such that both cutters may operate simultaneously on two axially aligned and relatively spaced holes. The production of such a tool comprises one of the objects of my invention.

My invention furthermore relates to an adjustable tool of the above-defined type wherein the two reaming cutters are so mounted that they may be relatively adjusted axially to spacings corresponding to the holes in the different work pieces to be operated upon. In accordance with my invention, I preferably mount one of the cutters on a supporting shank and the other cutter on a second shank splined within the first shank and extending through the first cutter, the second cutter being thereby axially adjustable toward and from the first cutter, and means also being provided for securing the second shank in adjusted position. The outer cutter is removable and replaceable and both cutters are preferably removable and interchangeable. This construction not only provides a convenient and efficient reaming tool but furthermore provides a tool which is adapted to interchangeably receive reaming cutters of varying sizes, it being understood that these cutters are so relatively inexpensive that a full set of the same may be purchased with the tool and interchangeably used thereon in any desired arrangement. The provision of such a tool comprises a further object of my invention.

In the accompanying drawing I have illustrated one specific embodiment of my invention but it will be understood that the invention can be otherwise embodied and that the drawing is not to be construed as defining or limiting the scope of the invention, the claims appended hereto being relied upon for that purpose.

Referring to the figures of the drawing,

Fig. 1 is a side elevation of my improved tool illustrated as reaming out two axially aligned holes in a work piece;

Fig. 2 is a longitudinal sectional view through the tool;

Fig. 3 is a side elevation of the inner tool element;

Figs. 4 and 5 are cross sectional views taken on lines 4—4 and 5—5 of Fig. 1;

Fig. 6 is an end elevation of one of the reaming cutters; and

Fig. 7 is an end elevation of the cutter receiving end of the element shown in Fig. 3.

In the accompanying drawing I have illustrated the preferred form of my invention, wherein the tool comprises two shank elements 10 and 12. The main shank 10 has its inner end squared at 14 and a bore 16 therein extending outwardly through the outer end of the shank. The shank 12 extends into this bore and is splined against rotation therein by means of a pin 18 extending into a spline groove 20. The shank 12 is, therefore, adjustable axially within the bore and may be secured in adjusted position by means of a screw 22 threaded into the shank 10 and engaging within the spline groove.

Each of the shanks 10 and 12 is adapted to carry a reaming cutter or other tool or element in the manner and for the purposes hereinafter described. I have herein illustrated two like reaming cutters 24 and 26 respectively cooperating with these two shanks 10 and 12. Each cutter is provided with a plurality of cutting teeth 28, the front ends of which are beveled at 30, and a pair of oppositely disposed notches 32 in the rear end of each cutter is adapted to be engaged by driving lugs on their respective shanks. In the construction as illustrated, these two cutters are identical and may be interchanged and replaced by other cutters of different sizes at will.

For the purpose of providing this interchanging of cutters, I have formed the shank 12 of uniform size throughout its length whereby it may receive either cutter and other cutters thereon as described herein. The cutter 24 is mounted on that portion of the shank 12 rearwardly of an abutment collar 34 secured thereto and is supported in abutting relation with the outer end of the main shank 10. A pair of lugs 36 on the shank end engages within the notches 32 whereby the cutter must rotate with the shank. The cutter 26 is mounted on the forward extremity 38 of the shank 12 and in abutting relation with the collar 34, this collar being pinned or otherwise secured to its shank. A pair of lugs 40 on the collar engages within the cutter notches 32 whereby to drive the cutter. The outer end 38 of the shank 12 may be internally bored and threaded at 42 and split at 44 whereby the application of an expanding screw 46 thereto is adapted to secure the cutter in place.

In Fig. 1, I have illustrated the use of my tool in reaming out a pair of axially aligned bearing holes 48 and 49 in a piston 50. In performing this operation, the proper cutters 24 and 26 are selected and the cutter 24 placed on the shank 12 and this shank inserted into the bore 16, as shown in Fig. 2. The shank 12 is then adjusted to the proper cutter spacing position in the bore and secured by means of the screw 22. The collar end of the shank 12 is then placed through the hole 48 and the cutter 26 thereafter placed thereon, it being understood that the securing screw 46 may or may not be employed. Upon rotation and forward movement of the shank 10, the cutters are passed through and finish the holes 48 and 49 simultaneously, each cutter not only performing its finishing operation but also acting as an aligning guide for the other cutter.

It will be understood that both the structure and use of my invention as herein specifically described can be considerably modified within the scope of the invention. For example, the bore 16 may be extended entirely through the shank 10, if desired, and other tools or even guide bushings may, for some purposes, be substituted for the reaming cutters illustrated. The forward cutter 26 is preferably removable, particularly for the purpose of permitting the insertion of the tool through the first hole in the work, and the cutter 24 is also preferably removable and interchangeable. Reamers as commonly made are so expensive as to usually preclude the carrying of a full set of varying sizes. The tool of my invention herein provides such simple and inexpensive cutters and such free and easy interchangeability thereof as to permit the carrying of a full set of varying sizes at little expense. Also, in the preferred form of the invention, the relative adjustment axially of the two cutters is secured by the use of two telescoped shanks as illustrated and freely interchangeability of all the cutters is secured by so constructing the tool that the cutter receiving portions of the shank 12 are of uniform diameter. Furthermore, while in Fig. 1 I have illustrated the finishing of two holes of equal size, it will be understood that my invention readily permits the use of two cutters of varying sizes, as may be required.

Having thus described my invention, what I claim as new and desire to secure by Letters Patent is:

1. An adjustable double reamer comprising a shank having a bore extending into the outer end thereof, a second shank splined to the first shank within the bore and extending outwardly of said end, the second shank being axially adjustable in the bore, means for securing the second shank in adjusted position, and two reaming cutters respectively and non-rotatably connected to the outer ends of the shanks, the said cutters being removable and interchangeable, the cutters being solely supported by the shanks and the second shank being solely supported by the first shank.

2. An adjustable reamer comprising a shank having a bore extending into one end thereof, a second shank adjustably splined within the bore and extending outwardly of said end, a reaming cutter on the second shank adjacent to the first shank, means holding the cutter against rotation relative to the first shank, an abutment of relatively large diameter on and adjacent to the outer end of the second shank, means for non-rotatably supporting a second reaming cutter against said abutment and non-rotatably on and adjacent to the outer end of the second shank, and means for holding the second shank in adjusted position, both said cutters being removable and replaceable.

ANTON M. VEDOE.